United States Patent [19]

Takagi et al.

[11] Patent Number: 4,531,116
[45] Date of Patent: Jul. 23, 1985

[54] WARNING SYSTEM FOR INDICATING ABSENCE OF EMERGENCY SPARE TIRE FROM A SPARE TIRE CONTAINER

[75] Inventors: Kazumasa Takagi; Yasuyuki Yamaguchi, both of Yokohama, Japan

[73] Assignee: Nissan Motor Company, Ltd., Japan

[21] Appl. No.: 408,703

[22] Filed: Aug. 16, 1982

[30] Foreign Application Priority Data

Sep. 28, 1981 [JP] Japan ................. 56-153146

[51] Int. Cl.³ .............. G08B 21/00; G08B 13/14
[52] U.S. Cl. ................. 340/568; 340/52 D; 340/666
[58] Field of Search ............ 340/52 D, 52 R, 64, 340/568, 665, 666, 667; 307/10 R

[56] References Cited

U.S. PATENT DOCUMENTS

| | | | |
|---|---|---|---|
| 2,705,316 | 3/1955 | Harris | 340/52 D |
| 3,636,547 | 1/1972 | Brace et al. | 340/568 |
| 4,218,672 | 8/1980 | Weisshappel et al. | 340/666 |

Primary Examiner—Glen R. Swann, III
Attorney, Agent, or Firm—Lowe, King, Price & Becker

[57] ABSTRACT

An ON-OFF switch device is mounted in an emergency spare tire container and assumes its ON-condition when the tire is absent from the container. A warning device is electrically actuated by the switch in such a mannner that when the switch assumes the ON-condition due to absence of the tire from the container, the warning device gives a warning.

18 Claims, 3 Drawing Figures

WARNING SYSTEM FOR INDICATING ABSENCE OF EMERGENCY SPARE TIRE FROM A SPARE TIRE CONTAINER

BACKGROUND OF THE INVENTION

1. Field of the Invention

The present invention relates in general to a safety system of a motor vehicle, and more particularly to a warning system which indicates whether an emergency spare tire is in the spare tire container or not, that is to say whether the emergency spare tire is being practically used or not.

2. Description of the Prior Art

For obtaining a larger space in a baggage room and/or reducing the weight of the vehicle, some motor vehicles are equipped with an "emergency spare tire" which is designed to be used only in case of an emergency. The emergency spare tire, sometimes called a space saver tire or temporary tire, is one which is reduced in weight and size as compared with a usual tire and is expanded to the size of the usual tire, upon its practical use, by feeding a pressurized air thereinto.

As is understood from the above, the essential purpose of equipping the emergency spare tire is to temporarily deal with an emergency case. Thus, the durability of such an emergency tire is poor as compared with the usual tire, so that it is not desirable to use the emergency spare tire practically for a long time. However, while using a motor vehicle, it sometimes happens that the driver has forgotten the use of the emergency spare tire after replacing the punctured usual tire by the emergency one, or that a relief driver is left uninformed of the use of the emergency spare tire. This is very dangerous when considering the poor durability of the emergency spare tire.

SUMMARY OF THE INVENTION

Therefore, it is an essential object of the present invention to provide a warning system which can solve the above-mentioned problem.

According to the present invention, there is provided a warning system which comprises a detecting device mounted in a spare tire containing recess for detecting whether the spare tire is or is not present in that recess; and a warning device electrically actuated by the detecting device in a manner to provide a warning when the detecting device detects absence of the spare tire in that recess.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

Figure 1:
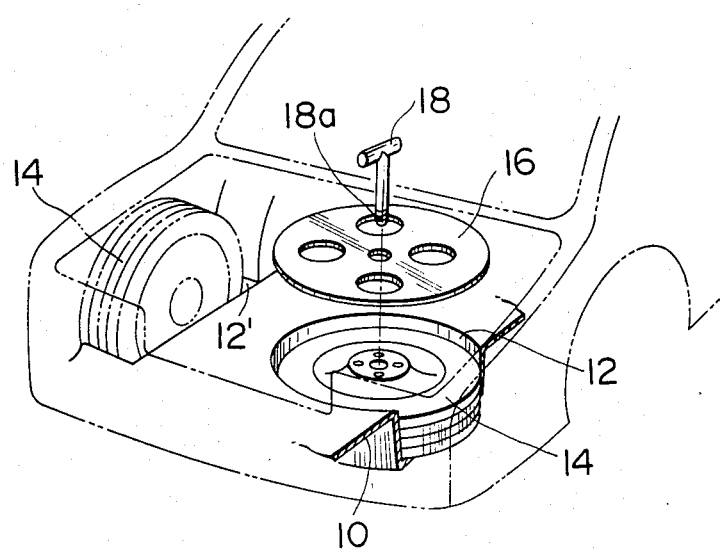
FIG. 1 is a perspective rear view of a motor vehicle, showing a baggage compartment in which an emergency spare tire is contained.

Referring to FIG. 1, there is shown a baggage compartment of a motor vehicle. A floor panel 10 of the baggage compartment is formed with a circular recess or tire container 12 in which an emergency spare tire 14 is contained or laid down. The diameter of the recess 12 is essentially the same as that of the tire 14, so that the tire 14 can be snugly and neatly received in the recess 12. In other words, the usual tires can not be received in the recess 12 because of the dimensional difference therebetween. Designated by numeral 16 is a circular lid which is removably connected by a connecting bolt 18 to the floor 10 to cover the recess 12 with the tire 14 therein. The leading end of the connecting bolt 18 is engageable with a tire absence detector in a manner as will be described herein next.

Figure 2:
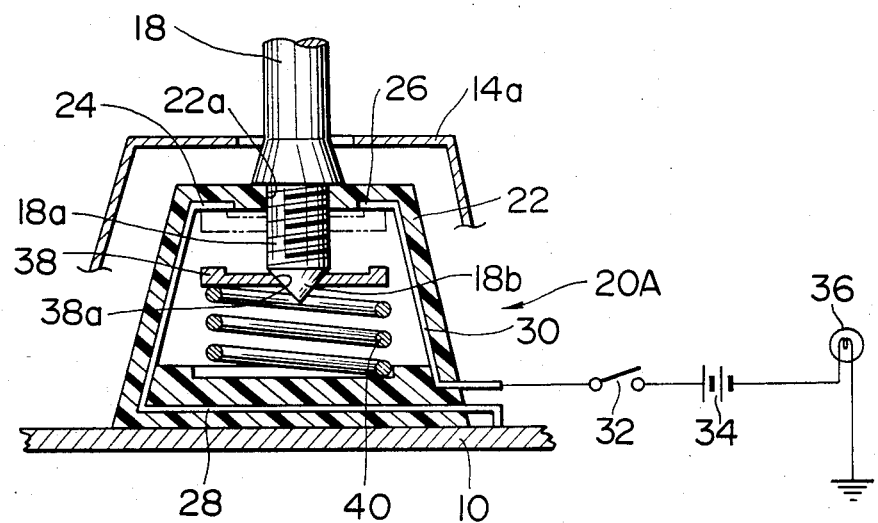
FIG. 2 is a sectional view of a tire absence detector employed in the present invention.

The tire absence detector is shown by FIG. 2, as being generally designated by numeral 20A. The detector 20A comprises a hollow body 22, constructed of insulating material, which is securely mounted on the central portion of the bottom of the recess 12. The body is formed at its upper wall portion with a threaded bore 22a with which a threaded end portion 18a of the connecting bolt 18 is engageable. Thus, screwing the connecting bolt 18 into the bore 22a to a certain extent induces a tight connection of the lid 16 to the floor panel 10. Designated by numeral 14a in FIG. 2 is a wheel disc portion of the tire 14. Two stationary contacts 24 and 26 are fixed to the inside surface of the body's upper wall at opposite positions with respect to the bore 22a. One of the contacts 24 and 26 is connected (or earthed) to the floor panel 10 through a lead wire 28 which is partially embedded in the body 22. The other contact 26 is connected in series through a lead wire 30 to an ignition switch responsive switch 32, an electric power source 34 (battery) and a warning lamp 36 in this order, one terminal of the lamp 36 being earthed as shown. The switch 32 closes when an ignition switch (not shown) assumes its ignition position for running the engine. Within the body 22 is disposed a movable contact 38 having sufficient size to contact simultaneously both of the spaced stationary contacts 24 and 26. The movable contact 38 is biased to move upwardly, that is, toward the stationary contacts 24 and 26 by a compression spring 40 disposed in the body 22. The movable contact 38 is formed at its middle section with a small opening 38a which is engageable with a pointed end 18b of the connecting bolt 18. It is thus to be noted that when the connecting bolt 18 is engaged with the bore 22a, the movable contact 38 assumes its OFF-position (indicated by a solid line), while, when the bolt 18 is removed from the bore 22a, the movable contact 38 assumes its ON-position (indicated by a phantom line) thus connecting the two stationary contacts 24 and 26.

When, in operation, the connecting bolt 18 is kept engaged with the bore 22a of the tire absence detector 20A with the emergency spare tire 14 received in the recess 12, the movable contact 38 is kept separated from the stationary contacts 24 and 26 the reason as mentioned hereinabove. Thus, under this condition, the warning lamp 36 does not operate even when the ignition switch assumes its ignition position. When, upon an emergent requirement for the tire 14, the connecting bolt 18 is disengaged or removed from the detector's body 22 for taking out the tire 14 from the recess 12, the movable contact 38 is brought into contact with the stationary contacts 24 and 26 by the action of the spring 40. Thus, in this condition, the warning lamp 36 operates to give a warning as long as the ignition switch assumes its ignition position. Usually, in an emergency case, the connecting bolt 18 is let alone in the baggage room after removal of the spare tire 14. Thus, the driver is compelled to drive the vehicle with the warning given by the warning lamp 36 until the emergency spare tire 14 is replaced with a usual tire. Thus, a dangerously long drive with the emergency spare tire 14 can be avoided in accordance with the present invention.

Figure 3:
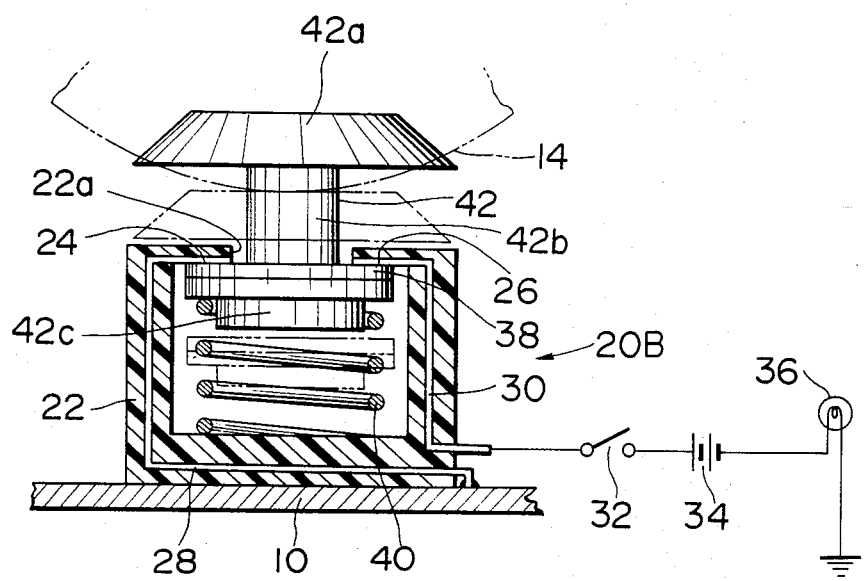
FIG. 3 is a sectional view of another tire absence detector employable in the present invention.

Another tire absence detector is shown by FIG. 3, as being generally designated by numeral 20B. This detector 20B is designed to detect the absence of an emergency spare tire 14 which is contained in the baggage compartment, standing vertically as indicated by phantom lines in FIG. 1. For stationarily holding the tire 14, the recess 12' is formed into a crescent shape. The detector 20B comprises a hollow body 22 constructed of insulating material which is securely mounted to the bottom of the recess 12'. The body 22 is formed at its upper wall portion with a bore 22a through which a shank portion 42b of the after-mentioned actuating member 42 loosely passes. Two stationary contacts 24 and 26 are fixed to the inside surface of the body's upper wall at opposite positions with respect to the bore 22a. These contacts 24 and 26 are connected through respective lead wires 28 and 30 to the floor panel 10, an ignition switch responsive switch 32, an electric power source 34 and a warning lamp 36 in the same manner as in the case of FIG. 2. The actuating member 42 has a tire supporting portion 42a projected outward from the bore 22a and a spring seat portion 42c located in the body 22. A movable contact 38 is attached to the upper surface of the spring seat portion 42c to be movable therewith. The actuating member 42 is biased to move upwardly, that is, in a direction to bring the movable contact 38 into contact with the stationary contacts 24 and 26 by a compression spring 40 disposed between the spring seat portion 42c of the actuating member 42 and the bottom of the body 22. It is thus to be noted that when the emergency spare tire 14 is kept in the recess 12', the actuating member 42 assumes its lowermost position permitting the movable contact 38 to assume its OFF-position (indicated by a phantom line), while, when the emergency spare tire 14 is absent from the recess 12', the actuating member 42 assumes its uppermost position permitting the movable contact 38 to assume its ON-position (indicated by a solid line). Thus, when the emergency spare tire 14 is under practical use, the driver is compelled to drive the vehicle with the warning given by the warning lamp 36.

As is understood from the above, in accordance with the present invention, the dangerous long driving time with the emergency spare tire can be avoided.

What is claimed is:

1. A warning system, comprising:
a detecting device mounted in a spare tire containing recess of a vehicle body for detecting whether the spare tires is present or not in said recess; and
a warning device electrically actuated by said detecting device in a manner to provide a warning when said detecting device detects absence of said spare tire from that recess.

2. A warning system as claimed in claim 1, in which said detecting device comprises an ON-OFF switch which assumes its ON-condition when said spare tire is absent from said recess, and assumes its OFF-condition when said spare tire is present in said recess.

3. A warning system as claimed in claim 2, in which said detecting device further comprises a biasing means which biases said switch to assume its ON-condition in case of absence of said tire from said recess.

4. A warning system as claimed in claim 3, in which said detecting means further comprises a connecting bolt which is used for fixing a lid to the vehicle body to cover said recess, said connecting bolt being engageable with said ON-OFF switch in such a manner that when said bolt is in a condition to fix said lid to the vehicle body, said switch assumes its OFF-condition, while, when said connecting bolt is in another condition to disengage said lid from the vehicle body, said switch assumes its ON-condition.

5. A warning system as claimed in claim 4, in which said warning device is connected to said detecting device through an ignition switch responsive switch which closes when an ignition switch of the vehicle assumes the ignition position.

6. A warning system for warning of absence of an emergency spare tire from a spare tire container of a motor vehicle body, said container being sized to receive therein said emergency spare tire but not a normal driving tire, said warning system comprising:
a detecting device mounted in said spare tire container for electrically detecting whether the emergency spare tire is or is not present in said container; and
an electric warning device connected to said detecting device and providing a warning when said detecting device detects absence of said emergency spare tire from said container.

7. A warning system as claimed in claim 6, in which said electric warning device is connected to said detecting device through an ignition switch responsive switch which closes when an ignition switch of the motor vehicle assumes an ignition position for running of the motor vehicle.

8. A warning system as claimed in claim 6, in which said detecting device comprises:
two spaced stationary contacts which are connected to said electric warning device through respective electrically conductive lines;
a movable contact which is capable of contacting both the two stationary contacts to establish an electric connection between two stationary contacts;
biasing means biasing said movable contact to move in a direction to contact said stationary contacts; and
an actuating member for actuating said movable contact in response to presence and absence of said emergency spare tire in said container.

9. A warning system claimed in claim 8, in which said actuating member moves said movable contact away from said stationary contacts when the emergency spare tire is present in said container.

10. A warning system as claimed in claim 9, in which said actuating member comprises a connecting bolt which is used for fixing a lid to the vehicle body to cover an opening of said container, the leading end of said fixing bolt being engageable with said movable contact to move same movable contact away from the stationary contacts against the biasing means.

11. A warning system as claimed in claim 10, in which said actuating member comprises a first portion on which said movable contact is mounted and a second portion which is projectable into said container.

12. A warning system for absence of a spare tire from a container therefor, comprising:
warning means for providing an alarm when said spare tire is not present in said container and detecting means actuated by presence of the spare tire within said container for disabling said warning means in response to presence of said tire.

13. A warning system as claimed in claim 12 wherein said detecting means comprises normally closed switch means having a pair of contacts and a displaceable arm for providing electrical connection between said contacts, and movable means activated by presence of said tire to move said displaceable arm away from at least one of said contacts thereby to break the electrical connection between said contacts.

14. A warning system as claimed in claim 13 further comprising bias means for biasing said displaceable arm to provide electrical connection between said contacts.

15. A warning system as claimed in claim 13 wherein said warning means is connected in a series circuit with said switch means and with a source of electrical power to provide said alarm upon closure of said switch when said tire is not in said recess.

16. A warning system as claimed in claim 15 further comprising ignition responsive switch means providing and interrupting flow of electrical power from said source therefor to said warning means in response to operation of an ignition switch.

17. A warning system as claimed in claim 16 wherein said ignition responsive switch means is operable for closing when said ignition switch is closed for opening when said ignition switch is open, said ignition responsive switch means connected in series with said warning means and with said power source for enabling said warning means only if said ignition switch is turned on and for disabling said warning means otherwise.

18. A warning system as claimed in claim 16 further comprising electrical lead wire means embedded in a housing surrounding said detecting means, wherein at least one of said contacts is connected to a terminal of said source of electrical power via said embedded electrical lead wire means.

* * * * *